United States Patent [19]

Foley, Jr.

[11] 4,327,202

[45] * Apr. 27, 1982

[54] STYRENE COPOLYMER FOR CONTACT LENSES

[75] Inventor: William M. Foley, Jr., Glendale, Calif.

[73] Assignee: John D. McCarry, El Toro, Calif.

[*] Notice: The portion of the term of this patent subsequent to Jan. 6, 1998, has been disclaimed.

[21] Appl. No.: 142,334

[22] Filed: Apr. 21, 1980

Related U.S. Application Data

[63] Continuation-in-part of Ser. No. 920,670, Jun. 30, 1978, Pat. No. 4,243,790, which is a continuation-in-part of Ser. No. 797,005, May 16, 1977, abandoned.

[51] Int. Cl.³ .................. C08F 212/06; C08F 212/08; C08F 214/18; G02C 7/04
[52] U.S. Cl. .................. 526/245; 351/160 R; 351/160 H; 526/251; 526/317; 526/320; 526/329.2
[58] Field of Search .................. 526/317, 320, 323.2, 526/329.2, 245, 251; 351/160 R, 160 H

[56] References Cited

U.S. PATENT DOCUMENTS

| | | |
|---|---|---|
| 3,080,348 | 1/1981 | Lang et al. .................. 526/329.2 |
| 3,542,461 | 11/1970 | Girard .................. 526/245 |
| 3,808,179 | 4/1974 | Gaylord .................. 526/245 |
| 3,950,315 | 4/1976 | Cleaver .................. 526/245 |
| 4,130,706 | 12/1978 | Plambeck .................. 526/245 |

*Primary Examiner*—Harry Wong, Jr.
*Attorney, Agent, or Firm*—Knobbe, Martens, Olson, Hubbard & Bear

[57] ABSTRACT

A novel contact lens having improved gas permeability is disclosed which is formed from copolymerizing a mixture comprising:

(a) a group 1 monomer which is a styrene or substituted styrene monomer, and
(b) a group 2 monomer which is a monomer of the general formula:

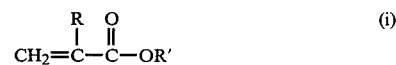

wherein R is hydrogen, methyl, ethyl, and R' is an alkyl, or a monomer of the general formula:

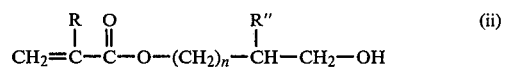

wherein n is 0 or 1, R is hydrogen, methyl or ethyl and R'' is hydrogen when n is 0 and hydrogen or hydroxyl when n is 1.

11 Claims, No Drawings

4,327,202

STYRENE COPOLYMER FOR CONTACT LENSES

CROSS REFERENCE TO RELATED APPLICATIONS

This is a continuation-in-part of my copending application Ser. No. 920,670, filed June 30, 1978, entitled STYRENE COPOLYMER FOR CONTACT LENSES now U.S. Pat. No. 4,243,790, which, in turn, is a continuation-in-part of application Ser. No. 797,005, filed May 16, 1977, now abandoned.

BACKGROUND OF THE INVENTION

It is well known that contact lenses are becoming more and more popular in our society. Many people are wearing contact lenses as opposed to conventional eyeglasses for reasons of convenience, improved appearance, lighter weight, and correction of sight abnormalities over a broad visual field. Most conventional contact lenses are made from methyl methacrylate. Lenses made from this material are known as "hard lenses". These lenses suffer from many deficiencies. For example, such lenses frequently produce corneal edema and/or a condition of extreme discomfort to the wearer's eye after repeated periods of extended wear, i.e., eighteen hours or more. This situation is known to be due to "oxygen starvation" and may also be associated with inadequate dissipation of carbon dioxide.

The epithelium of the cornea requires oxygen which is usually supplied from the oxygen dissolved in tears. However, because of the manner in which lenses conform to the contour of the eye, the flow of lacrimal fluid is greatly curtailed beneath the lens. This reduction in fresh lacrimal fluid is not desirable as it substantially reduces the contact of the eye with oxygen. Therefore, it is extremely important that the lens material itself be gas permeable. Prior art lenses have been of a material and thickness which fails to admit sufficient oxygen and/or release sufficient carbon dioxide to maintain a healthy normal condition for the eye tissue and cornea covered, especially when the lens is worn continuously for extended periods of time. In other words, the conventional lens cannot breathe through the body of the lens satisfactorily.

Due to the above problems, many workers in the field have experimented with the production of soft contact lenses. The presently known soft contact lenses are made of hydrophilic polymers, mainly comprising polyhydroxyethyl methacrylate (known in the art as "HEMA"). These hydrogel soft lenses are an improvement over the hard lenses but the materials themselves are not gas permeable. However, these materials absorb water and swell until equilibrium is attained and therefore possess a high degree of hydration which is directly related to the mode of oxygen transport. The highly hydrated lenses are able to obtain satisfactory oxygen transport levels but suffer from several resulting problems. First, since the soft lenses are used in the swollen state, the molecular materials of their composition are markedly reduced in mechanical strength and are extremely fragile. Due to this fragileness, the thickness of the lens must be increased and therefore these prior art soft lenses are ill-suited for the preparation of ultra-thin corneal lenses. By increasing the thickness of the lens, the gas permeability of the lens is thereby decreased forming a vicious cycle between gas permeability and strength.

In making an ultra-thin lens, the greater the strength and the greater the refractive index of the material used, the better the resulting thin lens.

A second problem associated with the prior art soft lenses is that since they are always worn in the wet and swollen state, they are easily contaminated with bacteria. Therefore, they need to be sterilized once a day by boiling. This boiling treatment is not only troublesome, but often causes decomposition and breakdown of the lens material. Thus, the prior art soft lenses are very short lived.

With specific reference to prior art presently considered to be most closely related to the subject invention, Hamm, U.S. Pat. No. 3,072,622, discloses polymerization products of alkyl styrenes with alkyl methacrylates suitable for use with as polymers for, e.g., lenses.

Lang et al, U.S. Pat. No. 3,080,348 discloses copolymers of styrene and methyl methacrylate, prepared by particular processing conditions.

Kaetsu et al, U.S. Pat. No. 3,983,083 teach soft contact lens polymers formed by the copolymerization of hydroxy alkyl acrylate or methacrylate in which the hydroxy alkyl contains two or three atoms, with another hydroxy alkyl acrylate or methacrylate in which the alkyl contains from four to 13 carbon atoms. Kaetsu et al discuss the problems for which their invention is one solution as follows:

"The presently known soft contact lenses are made of hydrophilic polymers . . . . These materials absorb water and swell until equilibrium is obtained and in the wet swollen state they are soft and flexible. Therefore, the known soft contact lenses are characterized in that they are always used in the swollen state. In such a swollen state, however, high molecular weight materials generally are markedly reduced in mechanical strength and are extremely fragile. In addition, since they are worn always in the wet and swollen state, these soft contact lenses are easily contaminated with bacteria. Therefore they need to be sterilized once a day by boiling. The boiling treatment is not only troublesome but often causes decomposition and breakdown of the lens material. Thus, the prior art soft contact lenses are very short-lived because of their characteristics of being used in the wet and swollen state. This is a serious practical defect and prevents their wide acceptance. Also, the prior art soft contact lenses are difficult to manufacture. Although the prior art soft contact lenses are used in the swollen state, the work of shaping and finishing such as cutting, machining, polishing, etc., must be applied to the polymeric material in the dry state, but it is very difficult to tell beforehand the precise shape, size, curvature and the like which the lens will assume in the swollen state. . . . In short, the known process for manufacturing the prior art soft contact lenses is complicated and difficult to control and the percentage of rejection is very high."

Kaetsu et al then go on to disclose their invention in which monomers of Group I and II, the two hydroxy alkyl monomer classes, are copolymerized sometimes with the addition of a Group III polymer to add strength. The polymerization is carried out using the conventional polymerization cross-linkers, initiators and techniques.

Kaetsu et al describe the product of their process, i.e., their soft lens polymer as follows:

"The thus obtained polymeric material is soft, flexible per se and can be used as is as soft contact lenses without swelling treatments. However, being soft in itself, this material is difficult to precisely cut, machine and polish and, therefore, cannot directly be subjected to shaping and finishing procedures to make soft contact lenses having precisely the desired shape, size and curvature. One aspect of the present invention (of Kaetsu et al) is characterized in that the thus obtained polymeric material for soft contact lenses is cooled nearly to the glass transition temperature of the polymer not higher than 0° C. to make it rigid and then, in the rigid state, is cut, machined and polished to produce a contact lens with the precise configuration."

Kaetsu et al give a number of examples of their polymers of which Example 6 is probably worthy of specific consideration. In Example 6, 20 parts of hydroxy propyl methacrylate and 40 parts of heptane diol monomethacrylate and 10 parts of triethylene glycol dimethacrylate and 10 parts of styrene are copolymerized together. The description of Example 6 then continues:

"The thus obtained copolymer was gradually cooled with liquid nitrogen and was subjected to machining to impart the configuration and size as a contact lens . . . ."

Kaetsu et al, thus, teaches the copolymerization of two different hydroxy alkyl acrylates or methacrylates. Kaetsu et al also teaches that if the polymers are formed in the way they are suggested, these polymers must be chilled to near the glass transition temperature, below 0° C., to be machined into lenses.

The disclosed invention obviates the above deficiencies in the prior art by providing a copolymer suitable for producing contact lenses which have a superiorly high strength and refractive index, that can withstand sterilization, and, in addition, offer superior gas permeability. These properties make the fabrication of an ultra-thin lens a practical reality.

SUMMARY OF THE INVENTION

A novel contact lens is disclosed which is formed from copolymerizing a mixture of:

(a) a group 1 monomer which is a styrene or substituted styrene monomer, and
(b) a group 2 monomer which is a monomer of the general formula:

wherein R is hydrogen, methyl or ethyl and R' is an alkyl, or a monomer of the general formula:

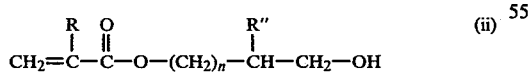

wherein n is 0 or 1, R is hydrogen, methyl or ethyl, and R" is hydrogen when n is 0 and hydrogen or hydroxyl when n is 1.

The Group 1 monomer will be hereinafter referred to as "styrene material" and the Group 2 monomer will be hereinafter referred to as an "acrylate material". Preferably, a suitable cross-linking agent is added to give desired strength.

The styrene material is up to 95% by weight of the monomer mixture. The acrylate material is 5 to 99% by weight of the monomer mixture. The styrene material content controls the stiffness of the resulting contact lens whereas the acrylate material controls the level of hydration. In addition, the styrene helps produce a gas permeable lens due to its chemical nature. More particularly with 20 to 30% by weight styrene material and balance mainly acrylate material, a soft contact lens results which is highly hydrated, e.g., 35% to 50% relatively strong, and possesses good optics and machinability. Preferably up to 10% by weight methacrylic acid is added in order to increase the elasticity and hydration of the resulting soft lens.

Alternatively, for a hard lens 40 to 50% by weight of styrene material is used with no methacrylic acid being added.

The styrene material content may be increased to above 50% to produce a gas permeable hard lens, although hydration levels will decrease below 20% as the proportion of acrylate material decreases. With a styrene material content of 80% or greater, up to 10% methacrylic acid may again be added to furnish additional hardness to the resulting lens.

The acrylate material may comprise the balance of the copolymer, except for the cross-linker content which is from about 1% to about 10%. Thus, the acrylate content of the lens may range from about 4% to about 94%.

Importantly, a polymerizable antiseptic comonomer may be added to the mixture to produce a lens which eliminates the nightly sterilization procedure. Another important feature of the invention is that the copolymer may be produced from conventional lens production techniques including cutting and polishing at room temperature.

Thus, the disclosed invention is a contact lens possessing all of the following properties:

1. A biocompatible lens material with excellent tissue compatability;
2. A chemically inert lens material which will resist hydrolysis even on boiling or immersion in alcohol;
3. A fine, very clear optical lens material with excellent refraction (e.g., styrene at about 1.56 with acrylate at 1.45);
4. A lens material of surprisingly good gas permeability since styrene materials, contrary to the conventional methyl methacrylate, enhance gas permeability;
5. A lens material which can tolerate a very high degree of hydration and yet retain its strength further enhancing gas permeability;
6. Good lens strength and toughness despite relatively high hydration and thin cross-section, e.g., a lens with 48% hydration and only about half a millimeter thick was found to have serviceable strength during handling while with prior art lenses, such thickness would render the lens too fragile;
7. A lens of superior mechanical integrity (even as an ultra-thin lens) having dimensional stability when boiled, molded, or machined while still being elastic and highly hydrated as a soft lens.
8. Surprising "graft-susceptibility", e.g., for grafting a bifocal section into a conventional soft lens;
9. A lens material that is surprisingly practical and inexpensive, styrene being commonly available at low cost.

DESCRIPTION OF THE PREFERRED EMBODIMENTS

The contact lens of the disclosed invention is formed from copolymerizing an acrylate material and a styrene material.

The styrene material will be understood as comprising any form of styrene or substituted styrenes such as alpha-aryl or alpha-alkyl styrenes or vinyltoluene or a like alkylated or halogenated styrene.

The acrylate material will be understood as comprising any monomer of the formula

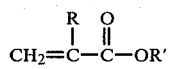

wherein R is hydrogen or methyl and R' is an alkyl. Also any hydroxy substituted propyl or ethyl acrylate or methacrylate is acceptable. This includes dihydroxy alkyl acrylates and methacrylates such as 2,3-di hydroxypropyl methacrylate. Most preferably, the acrylate material is 2-hydroxy-ethyl methacrylate hereinafter referred to as HEMA. Preferably, the copolymerization of these monomers is enhanced with cross-linking agents such as divinyl benzene, ethylene glycol dimethacrylate or diacrylate, diethyleneglycol dimethacrylate, or triethyleneglycol dimethacrylate hereinafter referred to as TEGDMA, or the like. The percentage of cross-linking agent is up to 10% by weight and preferably around 1%.

Varying the relative contents of the acrylate and styrene material provides control over the properties of the resulting lens. The higher the styrene material content, the stiffer the lens. Conversely, the higher the acrylate material content, the more hydrated the lens. Up to about 95% of the styrene material may be employed. However, percentages of styrene material above about 30% produce a "hard lens". The preferred styrene material content for a "soft lens" is about 20% to 30%.

Up to about 10% methacrylic acid may be added to the monomer mixture with styrene percentages up to about 30%. The acid increases the elasticity and hydration of the resulting lens.

A preferred soft lens composition is 20% to 30% styrene, 2% to 3% methacrylic acid, 1% cross-linking agent, and balance acrylate material. This gives a strong but elastic lens with high hydration, i.e. minimum of 30%, and good gas permeability.

With styrene material percentages of 40% to 80% methacrylic acid should not be added as poor optical properties may result. A preferred hydrate d "hard lens" formulation is 40% to 50% styrene, 1% cross-linking agent, and balance acrylate material. The hydration level will be about 20%.

If the styrene material content is increased above 50%, the hydration level of the resulting hard lens will decrease below 20%. However, a high quality, gas permeable lens can be obtained with percentages of styrene material up to about 95%. Moreover, with styrene material contents of 80% or more, methacrylic acid may be added to increase the hardness of the resulting lens without a decrease in optical quality.

An extremely important feature of the invention is the discovery of antiseptic moieties which may be added to the monomer mixture that will eliminate the need for nightly sterilization. This additional comonomer produces an "aseptic" contact lens new to the art. Thus, the lens eliminates the need for nightly sterilization required by all current hydrateable lenses.

In this aseptic formulation, the antiseptic moiety is directly bound to the polymer backbone, and cannot be removed.

The antiseptic grouping is a hydroxy substituted benzene. Preferable moieties are phenols, resorcinals, and catechols. In addition, this moiety must have a polymerizable functionality. This functionality can be any —C=C— and must be bonded to the benzene ring in addition to the hydroxyl groups. Examples of such polymerizable groups are vinyls, allyls, methacrylyls and acrylyls. Therefore, the polymerizable antiseptic moieties contemplated by this invention are exemplified as follows:

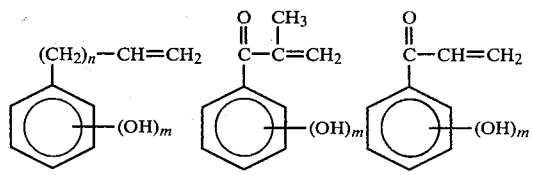

wherein n is an interger 0 or greater and m is 1, 2 or 3. Most preferably up to 3% by weight of the antiseptic moiety may be added.

It must be remembered, however, that the substituted phenols and the like have a structural resemblance to hydroquinone, hydroquinone monomethyl ether, and t-butyl catechol and therefore will have a somewhat inhibiting effect on the polymerization. This effect may be overcome by additional initiator, a common procedure for those skilled in the art.

A further advantage of the above-mentioned antiseptic moieties lies in the fact that they may be added to other current soft lens formulations, e.g., hema-methylmethacrylate copolymer, rendering them permanently aseptic and without significantly changing any other properties.

An important feature of the present invention is that the production of the lenses may be achieved by relatively conventional methods, so that the lenses may be successfully produced in commercial quantities.

In order to effect polymerization, the monomers are blended to homogenity. This mixture is then poured into molds (teflon or polyethylene) where curing takes place. Free radical initiators such as azobis isobutyronitrile, t-butyl peroctoate, t-butyl neodecanoate, t-butyl perpivalate, benzoyl peroxide, isopropyl percarbonate, or 2,5-dimethyl 2,5-diper-2-ethylhexoate, or the like may be used to begin the copolymerization.

Polymerization (curing) may be carried out quite conventionally with such initiators between about 40° C. and 100° C. Preferably, the mixture is cured in the molds at about 79° C. for about 1—1½ hours to form cylindrical lens blanks. The blanks are then annealed for 3 hours at 85° C., and then cut and polished at room temperature to form contact lenses. In the soft lens embodiment, they are then hydrated.

The following working examples are illustrative only and are not to be construed as limiting the scope of the invention. The lenses were prepared conventionally as outlined above unless otherwise specified.

Table 1 provides some typical preferred proportions of materials found quite satisfactory for "soft lens" and "hard lens" formulations.

TABLE 1

| Examples 1–6 | "Styrene" Material Wt % | "HEMA" Material Wt % | Cross-Linker Wt % | Methacrylic Acid Wt % |
|---|---|---|---|---|
| Soft Lens | | | | |
| 1 | 20 | 76 | 1 | 3 |
| 2 | 30 | 66 | 1 | 3 |
| 3 | 5 | 94 | 1 | 0 |
| Hard Lens | | | | |
| 4 | 93.5 | 4.0 | 1.5 | 1 |
| 5 | 83.5 | 14.0 | 1.5 | 1 |
| 6 | 73 | 25 | 2 | 0 |

Generally speaking, some very surprising contact lens properties are found for examples 1, 2, and 3. About 29% or more hydration has been realized along with good optical properties and strength which will withstand boiling for sterilization purposes. This is a considerable improvement over "conventional" soft lenses, especially in view of the elasticity rendered which was over 6x before rupture.

The "hard lens" formulations were surprisingly satisfactory with similar properties, except for reduced hydration and being inelastic, of course.

EXAMPLE 7

A preferred "soft lens" is prepared by copolymerizing styrene and HEMA, along with methacrylic acid and a cross-linking agent according to the invention, in the following preferred proportions:

TABLE II

| | | |
|---|---|---|
| Styrene Material | Styrene (Dow S 12T, b.p. 143–144° C. Atm.) | 10.0 gm |
| HEMA Material | 2-hydroxyethyl methacrylate (sipomer CL-100, Alcolac Chemical Co., freshly distilled) | 40.0 gm |
| Methacrylic Acid | Methacrylic acid (99.4%, Rohm & Haas Co.) | 1.5 gm |
| Cross-Linking Agent | Triethyleneglycol dimethacrylate (Haven Chemical Co.) | 0.5 gm |
| Initiator | 2,5-dimethylhexane-2,3-diper-2-ethylhexoate (U.S. Peroxygen Division, Witco Chemical Co., U.S. P. 245) | 8 Drops |

The resulting material is very satisfactory for use as a soft lens being very tough, yet elastic, with good optics, sterilizable by boiling or saline immersion and hydrateable to 48%. Even when so hydrated and formed into an ultra-thin contact lens, the material is very tough and durable, tolerating manual handling and boiling.

The material has improved permeability to oxygen and carbon dioxide. Small sections of these polymers may be formed and then 2-hydroxyethyl methacrylate graft polymerized to give a lens blank from which a bifocal contact lens may be made. Also soft contact lenses, with corrections for astigmatism, may be conveniently made.

The improved oxygen and carbon dioxide permeability, coupled with the ultra-thin lens cross-section, afford a soft contact lens with a much greater degree of comfort than previously possible.

EXAMPLE 8

To illustrate the close control over hydration and rigidity attainable with the claimed invention, the styrene content was increased over that in Example 7. The resulting composition was: 40% styrene, 57% HEMA, 2% methacrylic acid, and 1% TEGDMA. The monomer mixture was copolymerized by the conventional method. The mixture yielded a novel copolymer suitable for a "hard lens" which is readily "wettable", about 24% hydrateable, and with surprisingly high permeability to $O_2$ and $CO_2$ gas.

EXAMPLES 9–16

Table III below indicates eight modified contact lens formulations, understood as prepared as with Example 7, above, to yield the properties indicated, vatiations A through F indicating the effects of varied methacrylic acid concentration.

TABLE III

| | Variation A: 1% MAA | | Variation B: 1.5% MAA | | Variation C: 2% MAA | | Variation D: 3% MAA | | Variation E: 5% MAA | | Variation F: No MAA | |
|---|---|---|---|---|---|---|---|---|---|---|---|---|
| | % Hyd | Elas | % Hyd | Elas | % Hyd | Elas | % Hyd | Elas | % Hyd | Elas | % Hyd | Elas |
| #9. 5% Styrene 94% HEMA 1% TEGDMA | | | | | | | | | | | 29.1 | 6.4 |
| #10. 10% Styrene 89% HEMA 1% TEGDMA | | | | | | | | | | | 24.3 | 5.9 |
| #11. 10% Styrene 88–89% HEMA 1% TEGDMA | 31.3 | 6.8 | | | | | | | | | 24.3 | 5.9 |
| #12. 15% Styrene 82.5% HEMA 1% TEGDMA | | | 34.2 | 6.9 | | | | | | | | |
| #13. 20% Styrene 77–79% HEMA 1% TEGDMA | | | | | 38.7 | 5.6 | 48 | 6.4 | | | 18.8 | Inelastic-NB |
| #14. 30% Styrene 66–69% HEMA 1% TEGDMA | | | | | 35.5 | 6x NB | 45.6 | 6x NB | | | 17.7 | Inelastic-NB |
| #15. 40% Styrene 56–59% HEMA 1% TEGDMA | | | | | 24.1 | Not Break | 41.8 | 2x NB | | | | |
| #16. 48% Styrene 48% HEMA | | | | | | | 36.3 | 2–3x NB | | | | |

TABLE III-continued

| | Variation A:<br>1% MAA | | Variation B:<br>1.5% MAA | | Variation C:<br>2% MAA | | Variation D:<br>3% MAA | | Variation E:<br>5% MAA | | Variation F:<br>No MAA | |
|---|---|---|---|---|---|---|---|---|---|---|---|---|
| | % Hyd | Elas | % Hyd | Elas | % Hyd | Elas | % Hyd | Elas | % Hyd | Elas | % Hyd | Elas |
| 1% TEGDMA | | | | | | | | | | | | |

NOTE:
NB = Did not rupture under tension.

In all cases, it will be understood that except as otherwise indicated, a very satisfactory lens material was derived, with satisfactory (dry/wet) optical properties, satisfactory hydration (i.e., 30+% minimum hydration as water-saturation) and elasticity (for soft lens, i.e., minimum 2-4x linear stretchability limit).

Certain of the lens formulations in Table III provided good to excellent "soft lens" material, for example, 9-F, 11-A, 12-B, 13-C, 13-D, 14-C, and 14-D, though 14-d exhibited poor "optics" in the wet, hydrated condition. All of the above exhibited good machineability. Those providing good to excellent "hard lens" material were, for example, 10-F, 11-F, 13-F, 14-F, 15-C, and 16-D, which exhibited good to excellent optics, except for 15-D and 16-D whose optics were fair to poor especially when "wet". Here, it my be assumed that about 30% minimum hydration is needed for a good "soft lens".

Regarding elasticity, workers will agree that a good soft lens should have about "4-5x" (stretchable elongation under tension) elasticity; accordingly, it should be noted that Examples 13-F, 15-C, and 14-F were relatively "inelastic" and tough whereas Examples 15-D and 16-D were "marginally elastic" (i.e., 2-3x), but were quite "tough" (i.e., did not rupture under tension). Examples 14-C and 14-D were both "tough" and relatively elastic.

More particularly, Example 15-D will be seen as substantially equivalent to Example 7 and somewhat "preferred" for a soft lens being relatively strong and yet flexible, especially when dry and highly hydrated. Examples 11-C and 11-D are similar except they were more flexible, both wet and dry. Example 16-C, on the other hand, yielded a good "hard" lens material, being relatively rigid and strong, with about 24% hydration.

An unexpected criticallity was found in the amount of methacrylic acid which can be added to the formulation and still maintain good optical quality both wet and dry. Surprisingly, it was also found that the amount of styrene entered into this criticallity. Less than or more than the ideal amounts of both styrene and methacrylic acid reduced optical quality both wet and dry, the ideal range being 20–30 wt. % styrene and 2–3 wt. % methacrylic acid. Again, surprisingly, where there was no methacrylic acid present, optical quality was good both wet and dry for the entire range of samples tested. With about 40% styrene and the balance, no methacrylic acid gave satisfactory optics, whereas adding a few % methacrylic acid gave poor optics wet.

The following examples further illustrate the scope and various preferred embodiments of the invention:

EXAMPLE 17

2-Hydroxyethyl Methacrylate (Sipomer CL100, Alcolac Chem. Co.): 17.60 g
Styrene (Monsanto)*: 2.00 g
Methyl Methacrylate (DuPont)*: 0.40 g
Triethyleneglycol Dimethacrylate (Monomer-Polymer Labs)*: 0.20 g
2,5-Dimethylhexane-2,3-diper-2-ethyl hexoate (U.S.P. 245 Witco Chem. Co.)*: 3 drops

*Unless otherwise indicated, the same sources of the materials listed and marked with an asterisk (*) are used in the following examples.

The above were thoroughly mixed and cured one hour at 80° to 84° C., to give lens blanks with a hardness of 84 to 85D, the lenses with an equilibrium hydration level at 23.7% with excellent optics.

EXAMPLE 18

2-Hydroxyethyl Methacrylate: 20.00 g
Styrene: 2.00 g
Methyl Methacrylate: 2.02 g
Methacrylic Acid (Rohm and Haas)*: 0.40 g
Triethyleneglycol Dimethacrylate: 0.20 g
2,5-Dimethylhexane-2,3-diper-2-ethyl hexoate: 3 drops The above were thoroughly mixed and dried over Mg SO$_4$, filtered and cured for three hours at 80° C., to give lens blanks with a hardness of 88 to 84D, and lenses with an equilibrium hydration level of 34.7% and excellent optics.

EXAMPLE 19

2-Hydroxyethyl Methacrylate (Sipomer CL-100, Alcolac Chem. Co.): 20.00 g
Styrene: 2.00 g
2-Methoxyethyl Methacrylate: 2.02 g
Methacrylic Acid: 0.40 g
Triethyleneglycol Dimethacrylate: 0.20 g
2,5-Dimethylhexane-2,3-diper-2-ethyl hexoate: 3 drops The above were thoroughly mixed, dried over Mg SO$_4$, filtered and cured for three hours at 80° C., to give lens blanks with a hardness of 87 to 88D, and lenses with an equilibrium hydration level of 39.0% and excellent optics.

EXAMPLE 20

2-Hydroxyethyl Methacrylate (Sipomer CL-100, Alcolac Chem. Co.): 20.00 g
Styrene: 2.00 g
Ethoxyethyl Methacrylate: 2.00 g
Methacrylic Acid: 0.40 g
Triethyleneglycol Dimethacrylate: 0.20 g
2,5-Dimethylhexane-2,3-diper-2-ethyl hexoate: 3 drops The above were mixed thoroughly dried over Mg SO$_4$, filtered and cured at 80° C. for three hours to give lens blanks with a hardness of 88 to 89D, and lenses with an equilibrium hydration level of 44.2%, with excellent optics.

EXAMPLE 21

2-Hydroxyethyl Methacrylate: 20.00 g
Styrene: 3.00 g
Methyl Methacrylate: 1.00 g
Methacrylic Acid: 0.40 g
Triethyleneglycol Dimethacrylate: 0.20 g 2,5-Dimethylhexane-2,3-diper-2-ethyl hexoate: 3 drops The above were mixed thoroughly, dried over Mg SO$_4$, filtered and cured three hours at 80° C., to give lens blanks with a hardness of 89 to 90D, and lenses with an equilibrium hydration level of 37.2% and excellent optics.

EXAMPLE 22

2-Hydroxyethyl Methacrylate: 20.00 g
Styrene: 3.00 g
Methyl Methacrylate: 2.00 g
Methacrylic Acid: 0.70 g
Triethyleneglycol Dimethacrylate: 0.20 g
2,5-Dimethylhexane-2,3-diper-2-ethyl hexoate 2 drops
t-Butyl Perneodecanoate (Esperox 33M, Witco Chem. Co.)*: 2 drops The above were thoroughly mixed and dried over Mg SO$_4$, filtered and cured for three hours at 65° C. to give lens blanks with a hardness of 88 to 89D, and lenses with an equilibrium hydration level of 43.6% and excellent optics.

EXAMPLE 23

2-Hydroxyethyl Methacrylate: 20.00 g
Styrene: 3.00 g
Dodecafluoroheptyl Methacrylate (Polysciences)*: 2.00 g
Methacrylic Acid: 0.70 g
Triethyleneglycol Dimethacrylate: 0.20 g
2,5-Dimethylhexane-2,3-diper-2-ethyl hexoate: 2 drops
t-Butyl Perneodecanoate: 2 drops The above were thoroughly mixed, dried over Mg SO$_4$, filtered and cured at 65° C. for three hours to give lens blanks with a hardness of 87 to 89D and lenses with an equilibrium hydration level of 43.7% and excellent otpics.

EXAMPLE 24

2-Hydroxyethyl Methacrylate: 20.00 g
Styrene: 3.00 g
Ethoxyethyl Methacrylate: 2.00 g
Methacrylic Acid: 0.70 g
Triethyleneglycol Dimethacrylate: 0.20 g
2,5-Dimethylhexane-2,3-diper-2-ethyl hexoate: 2 drops
t-Butyl Perneodecanoate: 2 drops The above were thoroughly mixed, dried over Mg SO$_4$, filtered and cured three hours at 65° C. to give lens blanks with a hardness of 88 to 89D and an equilibrium hydration level of 48.3%, with excellent optics.

EXAMPLE 25

2-Hydroxyethyl Methacrylate: 20.00 g
Styrene: 1.03 g
Methyl Methacrylate: 1.00 g
Methacrylic Acid: 0.28 g
Triethyleneglycol Dimethacrylate: 0.20 g
2,5-Dimethylhexane-2,3-diper-2-ethyl hexoate: 2 drops
t-Butyl Perneodecanoate: 2 drops The above were thoroughly mixed, dried over Mg SO$_4$, filtered and cured three hours at 65° C., to give lens blanks with a hardness of 88 to 90D and lenses with an equilibrium hydration level of 39.9%.

EXAMPLE 26

2-Hydroxyethyl Methacrylate: 20.00 g
Vinyl Toluene (Polysciences)*: 1.00 g
Lauryl Methacrylate: 1.00 g
Methacrylic Acid: 0.28 g
Ethyleneglycol Dimethacrylate: 0.21 g
2,5-Dimethylhexane-2,3-diper-2-ethyl hexoate: 2 drops
t-Butyl Neoperdecanoate: 2 drops The above were thoroughly mixed and dried over Mg SO$_4$, filtered and cured three hours at 65° C. to give lens blanks with a hardness of 88D and lenses with an equilibrium hydration level of 35.7%, with excellent optics.

EXAMPLE 27

2-Hydroxyethyl Methacrylate: 20.00 g
Vinyl Toluene: 1.00 g
Methyl Methacrylate: 1.00 g
Methacrylic Acid: 0.28 g
Ethyleneglycol Dimethacrylate: 0.20 g
2,5-Dimethylhexane-2,3-diper-2-ethyl hexoate: 2 drops
t-Butyl Perneodecanoate: 2 drops The above were thoroughly mixed and dried over Mg SO$_4$, filtered and cured three hours at 65° C., to give lens blanks with a hardness of 89 to 90D and lenses with an equilibrium hydration level of 39.5% with excellent optics.

EXAMPLE 28

2-Hydroxyethyl Methacrylate: 20.00 g
Vinyl Toluene: 1.00 g
Ethoxyethyl Methacrylate: 1.00 g
Methacrylic Acid: 0.28 g
Ethyleneglycol Dimethacrylate: 0.20 g
2,5-Dimethylhexane-2,3-diper-2-ethyl hexoate: 2 drops
t-Butyl Perneodecanoate: 2 drops The above were thoroughly mixed and dried over Mg SO$_4$, filtered and cured three hours at 65° C. to give lens blanks with a hardness of 88 to 89D and lenses with an equilibrium hydration level of 38.8%, with excellent optics.

EXAMPLE 29

2-Hydroxyethyl Methacrylate: 20.00 g
Pentafluorostyrene (P.C.R.)*: 4.00 g
Methacrylic Acid: 2.00 g
Triethyleneglycol Dimethacrylate: 0.20 g
2,5-Dimethylhexane-2,3-diper-2-ethyl hexoate: 3 drops
t-Butyl Perneodecanoate: 3 drops The above were thoroughly mixed and dried over Mg SO$_4$, filtered and cured for one hour at 75° C. and four hours and forty-five minutes at 102° C. to give lens blanks with a hardness of 87 to 88D and lenses with an equilibrium hydration level of 70.3% with excellent optics.

EXAMPLE 30

2-Hydroxyethyl Methacrylate: 24.50 g
Pentafluorostyrene: 4.50 g
Methacrylic Acid: 0.75 g
Triethyleneglycol Dimethacrylate: 0.25 g
2,5-Dimethylhexane-2,3-diper-2-ethyl hexoate: 2 drops t-Butyl Perneodecanoate: 3 drops The above were thoroughly mixed and dried over Mg SO$_4$, filtered and cured for one hour at 75° C. and five hours at 100° C. to give lens blanks with a hardness of 87 to 89D and lenses with an equilibrium hydration level of 45.2% with excellent optics.

EXAMPLE 31

2-Hydroxyethyl Methacrylate: 20.00 g
Pentafluorostyrene: 3.00 g
Ethoxyethyl Methacrylate: 2.00 g
Methacrylic Acid: 0.70 g
Triethyleneglycol Dimethacrylate: 0.20 g
2,5-Dimethylhexane-2,3-diper-2-ethyl hexoate: 2 drops
t-Butyl Perneodecanoate: 2 drops The above were thoroughly mixed and dried over Mg SO$_4$, filtered and cured for three hours at 63° to 64° C., to give lens blanks with a hardness of 86 to 88D and lenses with an equilibrium hydration level of 47.4% with excellent optics.

EXAMPLE 32

2-Hydroxyethyl Methacrylate: 20.00 g
Pentafluorostyrene: 5.00 g
Dodecafluoroheptyl Methacrylate: 3.00 g
Methacrylic Acid: 1.00 g
Triethyleneglycol Dimethacrylate: 0.20 g
2,5-Dimethylhexane-2,3-diper-2-ethyl hexoate: 2 drops
t-Butyl Perneodecanoate: 2 drops The above were thoroughly mixed and dried over Mg SO$_4$, filtered and cured for three hours at 63.5° to give lens blanks with a hardness of 87 to 88D, and lenses with an equilibrium hydration level of 47.2% with excellent optics.

EXAMPLE 33

2-Hydroxyethyl Methacrylate: 20.00 g
Vinyl Toluene: 2.00 g
α-Methyl Styrene (Dow Chem. Co.)*: 1.00 g
Methyl Methacrylate: 2.00 g
Methacrylic Acid: 0.70 g
Ethyleneglycol Dimethacrylate: 0.22 g
2,5-Dimethylhexane-2,3-diper-2-ethyl hexoate: 2 drops
t-Butyl Perneodecanoate: 2 drops The above were thoroughly mixed and dried over Mg SO$_4$, filtered and cured for four hours and forty minutes at 65° C. to give lens blanks with a hardness of 90D and lenses with an equilibrium hydration level of 38.8% with excellent optics.

EXAMPLE 34

2-Hydroxyethyl Methacrylate: 20.00 g
Vinyl Toluene: 1.50 g
Styrene (Monsanto): 1.50 g
Methyl Methacrylate: 2.00 g
Methacrylic Acid: 0.70 g
Triethyleneglycol Dimethacrylate: 0.20 g
2,5-Dimethylhexane-2,3-diper-2-ethyl hexoate: 2 drops
t-Butyl Perneodecanoate: 2 drops The above were thoroughly mixed and dried over Mg SO$_4$, filtered and cured for sixteen hours at 65° C., to give lens blanks with a hardness of 89D and lenses with an equilibrium hydration level of 43.3%, with excellent optics.

EXAMPLE 35

2-Hydroxyethyl Methacrylate: 20.00 g
Vinyl Toluene: 1.00 g
Dodecafluoroheptyl Methacrylate: 1.00 g
Methacrylic Acid: 0.28 g
Ethyleneglycol Dimethacrylate: 0.20 g
2,5-Dimethylhexane-2,3-diper-2-ethyl hexoate: 2 drops
t-Butyl Perneodecanoate: 2 drops The above were thoroughly mixed and dried over Mg SO$_4$, filtered and cured for nineteen hours at 65° C., to give lens blanks with a hardness of 88 to 89D and lenses with an equilibrium hydration level of 41.5%, with excellent optics.

TABLE IV

Examples 17–35 (Wt. %, rounded)

| EXAMPLE | % HEMA | % STYRENE | % VT* | % PFS* | % MS* | % DFHMA* | % EOEMA* | % MOEMA* | % MMA* |
|---|---|---|---|---|---|---|---|---|---|
| 17 | 87 | 9 | | | | | | | 2 |
| 18 | 81 | 8 | | | | | | | 8 |
| 19 | 81 | 8 | | | | | | 8 | |
| 20 | 81 | 8 | | | | | 8 | | |
| 21 | 81 | 12 | | | | | | | 4 |
| 22 | 77 | 12 | | | | | | | 8 |
| 23 | 77 | 12 | | | | 8 | | | |
| 24 | 77 | 12 | | | | | 8 | | |
| 25 | 89 | 4.6 | | | | | | | 4.4 |
| 26 | 89 | | 4.4 | | | | | | |
| 27 | 89 | | 4.4 | | | | | | 4.4 |
| 28 | 89 | | 4.4 | | | | 4.4 | | |
| 29 | 76 | | | 15 | | | | | |
| 30 | 82 | | | 15 | | | | | |
| 31 | 77 | | | 12 | | | 8 | | |
| 32 | 68 | | | 17 | | 10 | | | |
| 33 | 77 | | 8 | | 4 | | | | 8 |
| 34 | 77 | 6 | 6 | | | | | | 8 |
| 35 | 89 | | 4.4 | | | 4.4 | | | |

| EXAMPLE | % MA* | % LMA* | % CROSS-LINKER | INITIATOR | HARDNESS (DUROMETER) | HYDRATION LEVEL % | OPTICAL QUALITY |
|---|---|---|---|---|---|---|---|
| 17 | | | 1(a) | (b) | 84–85 | 23.7 | E |
| 18 | 1.6 | | .8(a) | (b) | 88–89 | 34.7 | E |
| 19 | 1.6 | | .8(a) | (b) | 87–88 | 39 | E |

TABLE IV-continued

Examples 17-35 (Wt. %, rounded)

| | | | | | | | |
|---|---|---|---|---|---|---|---|
| 20 | 1.6 | | .8(a) | (b) | 88-89 | 44.7 | E |
| 21 | 1.6 | | .8(a) | (b) | 89-90 | 37.2 | E |
| 22 | 2.7 | | .8(a) | (b) + (c) | 88-89 | 43.6 | E |
| 23 | 2.7 | | .8(a) | (b) + (c) | 87-89 | 43.7 | E |
| 24 | 2.7 | | .8(a) | (b) + (c) | 88-89 | 48.3 | E |
| 25 | 1.2 | | .9(a) | (b) + (c) | 88-90 | 39.9 | |
| 26 | 1.2 | 4.4 | .9(d) | (b) + (e) | 88 | 35.7 | E |
| 27 | 1.2 | | .9(d) | (b) + (e) | 89-90 | 39.5 | E |
| 28 | 1.2 | | .9(d) | (b) + (e) | 88-89 | 38.8 | E |
| 29 | 7.5 | | .8(a) | (b) + (e) | 87-88 | 70.3 | E |
| 30 | 2.5 | | .8(a) | (b) + (e) | 87-89 | 45.2 | E |
| 31 | 2.7 | | .8(a) | (b) + (e) | 86-88 | 47.4 | E |
| 32 | 3.4 | | .7(a) | (b) + (e) | 87-88 | 47.2 | E |
| 33 | 2.7 | | .8(d) | (b) + (e) | 90 | 38.8 | E |
| 34 | 2.7 | | .8(a) | (b) + (e) | 89 | 43.3 | E |
| 35 | 1.2 | | .9(d) | (b) + (e) | 88-89 | 41.5 | E |

(a) triethyleneglycol dimethacrylate
(b) 2 5-dimethylhexane-2,3-diper-2-ethyl hexoate
(c) t-butyl peneodecanoate
(d) ethyleneglycol dimethacrylate
(e) t-butyl neoperdecanoate
*MA = methacrylic acid
*MMA = methyl methacrylate
*E = excellent
*DFHMA = dodecafluoroheptyl methacrylate
*MOEMA = 2-methoxyethyl methacrylate
*PFS = pentafluorostyrene
*MS = alpha-methyl styrene
*LMA = lauryl methacrylate
*VT = vinyl toluene
*EOEMA = ethyloxy ethoxymethacrylate As will be derived from a study of the foregoing disclosure, Table IV in particular, the present invention contemplates a number of closely related facets, all encompassed within the discovery that, quite surprisingly, styrene-acrylate monomers, as defined hereinbefore, when polymerized result in unexpectedly good contact lenses having a number of very advantageous properties which are not found in the prior art. Within this broad inventive concept, there have been a number of quite surprising developments as this work has progressed.

The invention, thus, contemplates contact lenses which have a durometer hardness of at least about 80 and, in the preferred embodiment, a saturated hydration level of at least about 20% and optionally at least about 30%, although in certain rigid lenses the hydration level may be lower than 20%. These lenses are characterized by being sufficiently hard and tough to be cut and polished at ambient temperature. These lenses consist essentially of the polymerization product of the monomers and monomer combination stated below, in combination with suitable cross-linking agents. (This invention does not, in any of its aspects, include the discovery that any particular cross-linking agent or agents are particularly effective nor does this invention in any of its aspects encompass the discovery that any particular polymerization initiator is required or preferable. Indeed, insofar as cross-linking agents and initiators are involved in the preparation of the lenses, there are conventional materials, used in the conventional way well known to those skilled in the art of carbon-double bond-carbon(vinyl) polymerization reactions.) The monomer combinations which, when polymerized, result in the inventive lens include the following:

Styrene monomers, the class defined hereinbefore, comprising from about 20% to about 30% of the lenses and optionally including from about 1% to about 10% of methacrylic acid, the balance consisting essentially of acrylic monomer as defined hereinbefore. These lenses are soft contact lenses which have a level of hydration of at least about 20% and most often at least about 30%, saturated.

Styrene monomers, as hereinbefore defined, comprising from about 30% to about 80% of the lens, the balance of the lens consisting essentially of acrylic monomer as defined hereinbefore. These lenses are intermediate or hard contact lenses and, in general, have a saturated hydration level of at least about 20%, although in certain instances the hydration level may be lower than 20%. In the preferred embodiment of these lenses, the styrene monomer comprises from about 40 to about 50% of the lens and the hydration level is at least about 30%.

Styrene comprising from about 20% to about 30% of the lens, methacrylic acid comprising from about 2% to about 3% of the lens, the balance consisting essentially of the hereinbefore defined acrylic monomer. These lenses have a durometer hardness of at least about 80 and a saturated hydration level of at least about 30%.

Styrene monomer, as defined hereinbefore, comprising from about 4% to about 20% of the lens, either methylmethacrylate or lauryl methacrylate comprising from about 1% to about 10% of the lens and optionally including up to about 3% of methacrylic acid, the balance of the lens consisting essentially of the hereinbefore defined acrylic monomers. These lenses have a durometer hardness of at least about 80 and a saturated hydration level in almost all instances of at least about 20%, although in certain instances the hydration level may be slightly lower. One of the very surprising discoveries made in connection with these lenses was that lauryl methacrylate in the range of from about 1% to about 10% of the lens resulted in unusually tough and durable lenses, with excellent hydration levels, suitable hardness for machining and polishing, and superb optical qualities.

Within the class of styrene monomers (in addition to styrene), vinyl toluene and α-methyl styrene have been shown to result, when polymerized as described hereinbefore, in excellent quality lenses of the type described.

The vinyl toluene or methyl styrene comprises from about 4% to about 20% of the lens, in one preferred embodiment of the invention, methylmethacrylate or lauryl methacrylate, the latter having the aforesaid advantages, comprising from about 1% to about 10% of the lens, the lens optionally including up to about 3% of methacrylic acid, and the balance of the lens consisting essentially of the hereinbefore defined acrylic monomers. These lenses have a durometer hardness of at least about 80, a saturated hydration level of about 20% in virtually all cases, and at least about 30% in most instances. Thus, these lenses are excellent soft and intermediate softness contact lenses.

Pentafluorostyrene, comprising from about 4% to about 20% of the lens, and optionally including up to about 10% of methacrylic acid, generally in the range of from 1% to 10%, the balance of the lens consisting of the hereinbefore defined acrylic monomer has resulted in most surprisingly high quality contact lenses. These lenses have a durometer hardness of at least about 80, a saturated hydration level of at least about 20% in nearly all instances and in most instances, and preferably, at least about 30%. In addition to having excellent optical qualities, being sufficiently hard and tough to be cut and polished at ambient temperature. These pentafluorostyrene containing lenses had a surprising and unexpectedly high oxygen permeability, much higher than the permeability of other styrene monomer containing contact lenses of the type described hereinbefore. The inclusion of a fluorene substituted methacrylate, e.g. dodecafluoroheptyl methacrylate, comprising from about 4% to about 10% of the lens, increased the oxygen permeability even further. Thus, in one preferred embodiment of this class of lenses, the pentafluorostyrene comprised from about 4 to about 20% of the lens, dodecafluoroheptyl methacrylate comprised from about 4 to about 10% of the lens, and the lens optionally included up to about 10% of methacrylic acid, the balance of the lens consisting essentially of the hereinbefore defined acrylic monomer.

It will be recognized from the extended discussion of the invention which has been given, and from the large number of examples which have been given to illustrate the various facets and preferred embodiments of the invention, that within the scope of the invention, within the concept of the invention and within the principles of the teaching of the invention and the specification, there are a number of equivalents which will be apparent to those skilled in the art. For example, other fluoro-substituted acrylic monomers would, within the teaching of this invention, be regarded as equivalent to the specific fluoro-substituted monomer given as an example. Likewise, other substituted styrene monomers would be regarded as the full equivalent of those given as exemplary. Thus, the specific examples are given to disclose and to exemplify the invention and not as limitations; the scope of the invention being as set forth in the appended claims.

What is claimed is:

1. A contact lens having a durometer hardness of at least about 80, a saturated hydration level of at least about 30%, being sufficiently hard and tough to be cut and polished at ambient temperature, consisting essentially of the polymerization product of the following monomers in combination with suitable cross-linking agents:

styrene monomer, comprising from about 20% to about 30% of the lens;

optionally including from about 1% to about 10% of methacrylic acid;

the balance of the lens consisting essentially of acrylic monomer having the general formula

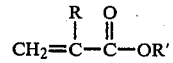

wherein R is hydrogen, methyl or ethyl, and R' is alkyl, and acrylic monomer having the general formula

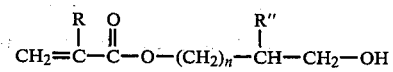

wherein n is 0 or 1, R is hydrogen, methyl or ethyl, and R" is hydrogen when n is 0 and hydrogen or hydroxyl when n is 1.

2. A contact lens having a durometer hardness of at least about 80, being sufficiently hard and tough to be cut and polished at ambient temperature, consisting essentially of the polymerization product of the following monomers in combination with suitable cross-linking agents:

styrene monomer, comprising from about 30% to about 80% of the lens;

the balance of the lens consisting essentially of acrylic monomer having the general formula

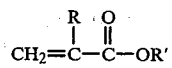

wherein R is hydrogen, methyl or ethyl, and R' is alkyl and acrylic monomer having the general formula

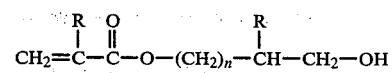

wherein n is 0 or 1, R is hydrogen, methyl or ethyl, and R" is hydrogen when n is 0 and hydrogen or hydroxyl when n is 1.

3. A contact lens having a durometer hardness of at least about 80, a saturated hydration level of at least about 30%, being sufficiently hard and tough to be cut and polished at ambient temperature, consisting essentially of the polymerization product of the following monomers in combination with suitable cross-linking agents:

styrene monomer, comprising from about 40% to about 50% of the lens;

the balance of the lens consisting essentially of acrylic monomer having the general formula

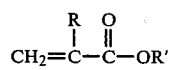

wherein R is hydrogen, methyl or ethyl, and R' is alkyl and acrylic monomer having the general formula

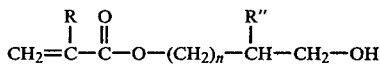

wherein n is 0 or 1, R is hydrogen, methyl or ethyl, and R" is hydrogen when n is 0 and hydrogen or hydroxyl when n is 1.

4. A contact lens having a durometer hardness of at least about 80, a saturated hydration level of at least about 30%, being sufficiently hard and tough to be cut and polished at ambient temperature, consisting essentially of the polymerization product of the following monomers in combination with suitable cross-linking agents:

styrene, comprising from about 20% to about 30% of the lens;

methacrylic acid, comprising from about 2% to about 3% of the lens;

the balance of the lens consisting essentially of acrylic monomer having the general formula

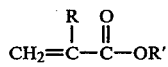

wherein R is hydrogen, methyl or ethyl, and R' is alkyl and acrylic monomer having the general formula

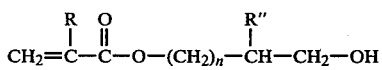

wherein n is 0 or 1, R is hydrogen, methyl or ethyl, and R" is hydrogen when n is 0 and hydrogen or hydroxyl when n is 1.

5. A contact lens having a durometer hardness of at least about 80, a saturated hydration level of at least about 20%, being sufficiently hard and tough to be cut and polished at ambient temperature, consisting essentially of the polymerization product of the following monomers in combination with suitable cross-linking agents:

styrene monomer, comprising from about 4% to about 20% of the lens;

methyl methacrylate or lauryl methacrylate, comprising from about 1% to about 10% of the lens;

optionally including up to about 3% of methacrylic acid;

the balance of the lens consisting essentially of acrylic monomer having the general formula

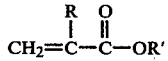

wherein R is hydrogen, methyl or ethyl, and R' is alkyl, other than methyl methacrylate and lauryl methacrylate, or of the general formula

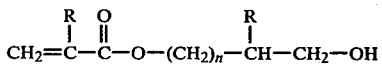

wherein n is 0 or 1, R is hydrogen, methyl or ethyl, and R" is hydrogen when n is 0 and hydrogen or hydroxyl when n is 1.

6. A contact lens having a durometer hardness of at least about 80, a saturated hydration level of at least about 20%, being sufficiently hard and tough to be cut and polished at ambient temperature, consisting essentially of the polymerization product of the following monomers in combination with suitable cross-linking agents:

vinyl toluene, comprising from about 4% to about 20% of the lens;

methylmethacrylate or lauryl methacrylate, comprising from about 1% to about 10% of the lens;

optionally including up to about 3% of methacrylic acid;

the balance of the lens consisting essentially of acrylic monomer having the general formula

wherein R is hydrogen, methyl or ethyl, and R' is alkyl other than methyl methacrylate and lauryl methacrylate, or of the general formula

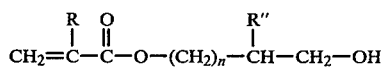

wherein n is 0 or 1, R is hydrogen, methyl or ethyl, and R" is hydrogen when n is 0 and hydrogen or hydroxyl when n is 1.

7. A contact lens having a durometer hardness of at least about 80, a saturated hydration level of at least about 20%, being sufficiently hard and tough to be cut and polished at ambient temperature, consisting essentially of the polymerization product of the following monomers in combination with suitable cross-linking agents:

pentafluorostyrene, comprising from about 4% to about 20% of the lens;

optionally including up to about 10% of methacrylic acid;

the balance of the lens consisting essentially of acrylic monomer having either the general formula

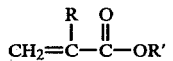

wherein R is hydrogen, methyl or ethyl, and R' is alkyl, or of the general formula

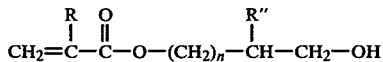

wherein n is 0 or 1, R is hydrogen, methyl or ethyl, and R" is hydrogen when n is 0 and hydrogen or hydroxyl when n is 1.

8. A contact lens having a durometer hardness of at least about 80, a saturated hydration level of at least about 20%, being sufficiently hard and tough to be cut and polished at ambient temperature, consisting essentially of the polymerization product of the following monomers in combination with suitable cross-linking agents:

pentafluorostyrene, comprising from about 4% to about 20% of the lens;

dodecafluoroheptyl methacrylate, comprising from about 4% to about 10% of the lens;

optionally including up to about 10% of methacrylic acid;

the balance of the lens consisting essentially of acrylic monomer having either the general formula $$CH_2=\underset{R}{C}-\underset{O}{\overset{O}{C}}-OR' \qquad I$$

wherein R is hydrogen, methyl or ethyl, and R' is alkyl, or of the general formula $$CH_2=\underset{R}{C}-\underset{O}{\overset{O}{C}}-O-(CH_2)_n-\underset{R''}{CH}-CH_2-OH \qquad II$$

wherein n is 0 or 1, R is hydrogen, methyl or ethyl, and R'' is hydrogen when n is 0 and hydrogen or hydroxyl when n is 1.

9. A contact lens having a durometer hardness of at least about 80, a saturated hydration level of at least about 20%, being sufficiently hard and tough to be cut and polished at ambient temperature, consisting essentially of the polymerization product of the following monomers in combination with suitable cross-linking agents:

styrene monomer, comprising from about 4% to about 20% of the lens;

dodecafluoroheptyl methacrylate, ethoxyethyl methacrylate, or methoxyethyl methacrylate, methyl methacrylate, or lauryl methacrylate, comprising from about 4% to about 10% of the lens;

optionally including up to about 10% of methacrylic acid;

the balance of the lens consisting essentially of acrylic monomer having either the general formula $$CH_2=\underset{R}{C}-\underset{O}{\overset{O}{C}}-OR' \qquad I$$

wherein R is hydrogen, methyl or ethyl, and R' is alkyl other than methyl methacrylate and lauryl methacrylate, or of the general formula $$CH_2=\underset{R}{C}-\underset{O}{\overset{O}{C}}-O-(CH_2)_n-\underset{R''}{CH}-CH_2-OH \qquad II$$

wherein n is 0 or 1, R is hydrogen, methyl or ethyl, and R'' is hydrogen when n is 0 and hydrogen or hydroxyl when n is 1.

10. A contact lens having a durometer hardness of at least about 80, a saturated hydration level of at least about 20%, being sufficiently hard and tough to be cut and polished at ambient temperature, consisting essentially of the polymerization product of the following monomers in combination with suitable cross-linking agents:

styrene monomer, comprising from about 4% to about 20% of the lens;

lauryl methacrylate, comprising from about 4% to about 10% of the lens;

optionally including up to about 10% of methyl methacrylate;

the balance of the lens consisting essentially of acrylic monomer having either the general formula $$CH_2=\underset{R}{C}-\underset{O}{\overset{O}{C}}-OR' \qquad I$$

wherein R is hydrogen, methyl or ethyl, and R' is alkyl other than methyl methacrylate and lauryl methacrylate, or of the general formula $$CH_2=\underset{R}{C}-\underset{O}{\overset{O}{C}}-O-(CH_2)_n-\underset{R''}{CH}-CH_2-OH \qquad II$$

wherein n is 0 or 1, R is hydrogen, methyl or ethyl, and R'' is hydrogen when n is 0 and hydrogen or hydroxyl when n is 1.

11. A contact lens as claimed in claims 1, 2, 3, 4, 5, 6, 7, 8, 9 or 10 wherein the monomer of formula II comprises hydroxyethyl methacrylate.

* * * * *